United States Patent
Faber et al.

(10) Patent No.: US 12,012,157 B2
(45) Date of Patent: Jun. 18, 2024

(54) PLANETARY ROLLER SCREW AND ACTUATOR FOR A REAR AXLE STEERING OF A MOTOR VEHICLE COMPRISING SUCH A PLANETARY ROLLER SCREW

(71) Applicant: Schaeffler Technologies AG & Co. KG, Herzogenaurach (DE)

(72) Inventors: Daniel Faber, Nuremberg (DE); Benjamin Wuebbolt-Gorbatenko, Erlangen (DE); Alexander Hausmann, Erlangen (DE); Alena Pöhnlein, Lonnerstadt (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 79 days.

(21) Appl. No.: 17/429,472

(22) PCT Filed: Dec. 6, 2019

(86) PCT No.: PCT/DE2019/101050
§ 371 (c)(1),
(2) Date: Aug. 9, 2021

(87) PCT Pub. No.: WO2020/164655
PCT Pub. Date: Aug. 20, 2020

(65) Prior Publication Data
US 2022/0089210 A1    Mar. 24, 2022

(30) Foreign Application Priority Data
Feb. 12, 2019 (DE) ..................... 10 2019 103 383.7

(51) Int. Cl.
*B62D 5/04* (2006.01)
*F16H 25/22* (2006.01)
*F16H 25/24* (2006.01)

(52) U.S. Cl.
CPC ....... *B62D 5/0451* (2013.01); *F16H 25/2252* (2013.01); *F16H 25/24* (2013.01)

(58) Field of Classification Search
CPC ... B62D 5/0451; F16H 25/2252; F16H 25/24; F16H 25/2006; F16H 25/22
See application file for complete search history.

(56) References Cited

U.S. PATENT DOCUMENTS

2005/0247150 A1* 11/2005 Tsubono .............. B62D 5/0451
74/424.92
2006/0113142 A1    6/2006 Yun
(Continued)

FOREIGN PATENT DOCUMENTS

CN    102628500 A    8/2012
DE    8601149 U1    4/1986
(Continued)

*Primary Examiner* — Zakaria Elahmadi

(57) ABSTRACT

Planetary roller screw having a threaded spindle, and having a nut element arranged on the threaded spindle, and having planets arranged distributed around the periphery of the threaded spindle, which mesh on one side with the threaded spindle and on the other side with the nut element, which is rotatably mounted in both axial directions in each case by means of a first bearing on a rotationally driven planet carrier which receives the planets and is rotatably mounted on a housing by means of a second bearing. The planet carrier has a sleeve encompassing the nut element, at the axial ends of which a flange respectively having a first bearing seat of the first bearing and a second bearing seat of the second bearing is arranged, the flanges being connected with play to one another by means of the sleeve in a rotationally fixed manner and axially with actuating play.

12 Claims, 2 Drawing Sheets

(56) References Cited

U.S. PATENT DOCUMENTS

2016/0305519 A1\* 10/2016 Schumann .......... F16H 25/2252
2016/0348775 A1    12/2016 Schumann et al.
2019/0011026 A1\*  1/2019 Tesar ................. F16H 25/2252
2019/0118854 A1\*  4/2019 Tate ....................... B62D 5/001
2019/0234500 A1\*  8/2019 Johnson ................ H02K 7/116

FOREIGN PATENT DOCUMENTS

| | | |  |
|---|---|---|---|
| DE | 19859325 A1 | 6/2000 | |
| DE | 102007037484 A1 | 2/2009 | |
| DE | 102010011819 A1 | 9/2011 | |
| DE | 102010011820 A1 | 9/2011 | |
| DE | 102013202700 A1 | 9/2013 | |
| DE | 102013213704 A1 | 1/2015 | |
| DE | 102015206735 B3 | 5/2016 | |
| DE | 102015207391 A1 \* | 10/2016 | ............. F16D 23/12 |
| DE | 102015204587 B4 | 11/2016 | |
| DE | 102015212333 A1 \* | 1/2017 | ............. F16H 25/22 |
| DE | 102015212333 A1 | 1/2017 | |
| DE | 102015225633 A1 | 6/2017 | |
| DE | 102017124389 A1 | 8/2018 | |
| DE | 102007006321 B4 | 1/2019 | |
| DE | 102017124388 A1 | 1/2019 | |
| EP | 0603067 A1 | 6/1994 | |
| EP | 1596101 A2 \* | 11/2005 | ........... B62D 5/0451 |
| EP | 2947348 A1 | 11/2015 | |
| JP | 2007057046 A | 3/2007 | |
| JP | 2017223301 A | 12/2017 | |
| JP | 2018013167 A | 1/2018 | |
| JP | 2018167751 A | 11/2018 | |
| WO | 2009020062 A1 | 2/2009 | |
| WO | WO-2015078463 A1 \* | 6/2015 | ............. F16D 23/12 |
| WO | 2018068932 A1 | 4/2018 | |
| WO | 2020164653 A1 | 8/2020 | |

\* cited by examiner

PLANETARY ROLLER SCREW AND ACTUATOR FOR A REAR AXLE STEERING OF A MOTOR VEHICLE COMPRISING SUCH A PLANETARY ROLLER SCREW

CROSS-REFERENCE TO RELATED APPLICATIONS

This application is the U.S. National Phase of PCT Appln. No. PCT/DE2019/101050 filed Dec. 6, 2019, which claims priority to DE 10 2019 103 383.7 filed Feb. 12, 2019, the entire disclosures of which are incorporated by reference herein.

TECHNICAL FIELD

The present disclosure relates to a planetary roller screw and an actuator of a steering device of a motor vehicle, in particular a rear axle steering or a steer-by-wire steering system with such a planetary roller screw.

BACKGROUND

From DE102015212333 A1 a planetary roller screw and an actuator for actuating a vehicle component have become known.

The planetary roller screw is provided with a threaded spindle and with a nut element arranged on the threaded spindle. Planets distributed around the periphery of the threaded spindle mesh on one side with the threaded spindle and on the other side with the nut element, which is rotatably mounted in both axial directions in each case by means of a first bearing on a rotationally driven planet carrier that receives the planets. The planet carrier is rotatably mounted on a housing by means of a second bearing. This second bearing is designed as a floating bearing. If the planet carrier is to be driven, for example, by means of a belt drive, the tensile forces occurring in the traction mechanism exert a tilting moment on the second bearing that, in the case of a floating bearing, can lead to undesirable deflections.

SUMMARY

It is desirable to specify a planetary roller screw which can be operated reliably.

This is achieved by a planetary roller screw as described herein. The planetary roller screw is provided with a threaded spindle and with a nut element arranged on the threaded spindle. Planets distributed around the periphery of the threaded spindle mesh on one side with the threaded spindle and on the other side with the nut element, which is rotatably mounted in both axial directions in each case by means of a first bearing on a rotationally driven planet carrier that receives the planets. The planet carrier is rotatably mounted on a housing by means of a second bearing. The planet carrier has a sleeve encompassing the nut element, at the axial ends of which a flange respectively having a first bearing seat of the first bearing and a second bearing seat of the second bearing is arranged, the flanges being connected with play to one another by means of the sleeve in a rotationally fixed manner and axially with actuating play.

With this arrangement, for example, the planet carrier can be driven by means of a belt drive. Undesired tilting moments in the second bearing are avoided due to the support on both sides.

The actuating play between the two flanges is used to precisely set a bearing spacing between the first two bearings. The actuating play also enables the second bearing to be set in the axial direction. The bearing seats for both bearings are provided on both flanges. Because the first and second bearings are connected in series, a bearing spacing of the second bearings can be set at the same time as setting the bearing spacing of the first bearings.

The non-rotatable connection of the two flanges with the sleeve avoids undesired rotational movements of the two flanges with respect to one another. Both flanges support the planets; the non-rotatable connection avoids undesired entanglement of the planets.

The nut element can have a multi-part nut with two nut parts arranged axially one behind the other as well as a tensioning element tensioning the nut parts.

The tensioning element preferably tensions both nut parts towards one another. For this purpose, the tensioning element can grip around the two nut parts like a clamp and exert sufficient pretensioning on the two nut parts so that they are shifted towards one another so far that both nut parts are in play-free engagement with the planets. Usually, the planets and the nut parts are provided with interlocking planet-side and nut-side groove profiles, the peripheral teeth of which rest against one another in rolling engagement. The planets are pretensioned under pressure. The pretensioning force acts within the nut element with the planet and is not transferred to the first mounting. This means that only an external operating load acting on the threaded spindle is transferred to the first mounting via the nut element, which thus requires smaller sizing compared to a structural arrangement in which the pretensioning force is absorbed by other components, such as a mounting of the nut element.

As an alternative and in a space-saving manner, a variant is proposed, the two nut parts of which are screwed together. One nut part has an external thread; the other nut part has an internal thread meshing with the external thread. The two tensioning sleeves can be omitted. Both nut parts are supported and connected to one another by means of the screw connection. Both nut parts mesh with the planets and exert pressure thereon. Both nut parts are pretensioned towards one another.

The two first bearings are preferably arranged axially between the two second bearings. The first bearings are arranged on sides of the flanges facing one another and the second bearings are arranged on opposite flange sides of the flanges. In this arrangement, the above-mentioned actuating play enables the second bearing to be easily adjusted in the axial direction. Due to the two-sided bearing seats on both flanges, the first and second bearings are connected in series. Setting a bearing spacing of the second bearing at the same time as setting the bearing spacing of the first bearing is possible with this arrangement. When one of the two second bearings is adjusted along an axial adjustment path in the direction of the other second bearing by means of an adjusting part supported on the housing, the distance between the two first bearings is adjusted together with the adjustment of the second bearings.

The first bearings ensure reliable actuation of the planet carrier through the correct positioning and mounting of the planet carrier and thus in particular the planet with respect to the nut element. Correct positioning of the nut element and the planet carrier with respect to one another is ensured in the radial and axial directions.

The planetary roller screw can be part of an actuator for a steering device of a motor vehicle, preferably for rear axle steering or for a steer-by-wire steering system. This actuator is provided with a housing in which the planetary roller screw is arranged, and with a steering rod penetrating the housing, part of which is the threaded spindle, and with an electric motor driving the planet carrier. The threaded spindle can have steering rod parts at its axial ends that pierce the housing and are rigidly connected to the threaded spindle.

The nut element can have a nut and a tensioning element or a tensioning element integrated into the nut, which pretensions two nut parts of the nut arranged axially one behind the other towards one another. If the pretensioning of the planets is sufficiently high, the technical requirement of a standstill of the steering rod can be achieved in the application in an actuator of a rear axle steering, if, for example, the actuator motor fails. An automatic adjustment of the steering rod under an attacking external axial load is excluded if the pretensioning is sufficiently high.

Alternatively, the planetary roller screw can also be used in what are termed steer-by-wire actuators. In this case, the wheels of the front axle of the motor vehicle are articulated. In this case, the amplitudes of the steering rod are significantly larger compared to the rear axle. The steering rod can therefore be designed for correspondingly large travel ranges.

BRIEF DESCRIPTION OF THE DRAWINGS

The planetary roller screw is explained in more detail below with reference to exemplary embodiments shown in a total of four figures. In the drawings.

DETAILED DESCRIPTION

Figure 1:
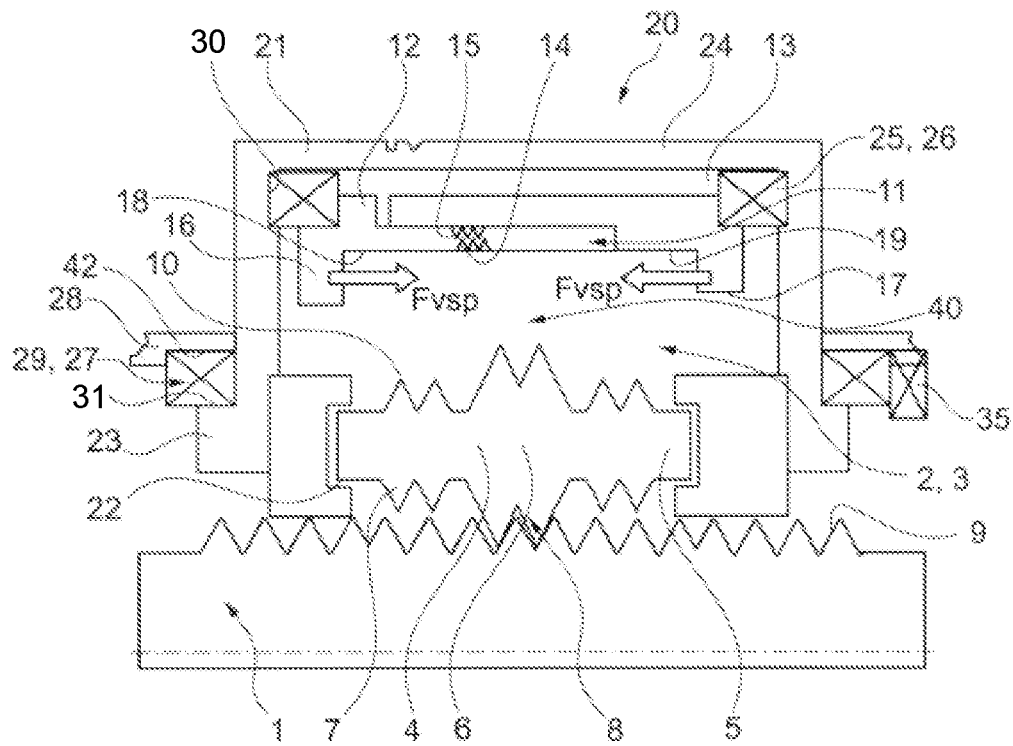
FIG. 1 shows a schematic representation of a longitudinal section through a planetary roller screw.

FIG. 1 shows a planetary roller screw in longitudinal section. A nut 2, which in this example is arranged rotatably fixed, is arranged on the threaded spindle 1, which nut is formed from nut parts 3 arranged one behind the other along the threaded spindle 1. Planets 4, which mesh on one side with the threaded spindle 1 and on the other side with the nut 2, are arranged distributed around the periphery of the threaded spindle 1.

In a known manner, the planets 4 are each provided with radially tapered end sections 5 and a radially enlarged central section 6 arranged between the two end sections 5. All sections are each provided with a groove profile 7, 8 on their periphery. The groove profile 8 of the central section 6 meshes with a thread profile 9 arranged on the outer periphery of the threaded spindle 1. The groove profiles 7 of the end sections 5 mesh with a groove profile 10 formed on the inner periphery of the nut 2. All of the groove profiles 7, 8, 10 are formed in a known manner by self-contained grooves arranged transversely to the respective longitudinal axis. Adjacent grooves are delimited by closed teeth.

On the nut 2 is arranged a tensioning element 11 that axially pretensions the nut 2 and which has two tensioning sleeves 12, 13 that support each other in the axial direction, one of which is supported on one nut part 3 and the other on the other nut part 3. The first tensioning sleeve 12 has an external thread 14 and the second tensioning sleeve 13 has an internal thread 15. The two tensioning sleeves 12, 13 are screwed together with their external thread 14 and internal thread 15, both tensioning sleeves 12, 13 each having a nut seat 18, 19 for receiving one of the nut parts 3. The two tensioning sleeves 12, 13 are supported on the two nut parts 3, for example, by means of radial rims 16, 17 that are formed on the tensioning sleeves 12, 13. A spacer disk 40 is arranged axially between the two tensioning sleeves 12, 13, the thickness of which is sized such that the two nut parts 3, which are pretensioned towards one another, are in play-free engagement with the planets 4. The planets 4 are therefore pretensioned under pressure.

The nut 2 can be part of a nut element 20, which in the present case is formed from the nut 2 and the tensioning element 11. The pretensioning force acts within this nut element 20.

The planets 4 are rotatably mounted in a planet carrier 21. The planet carrier 21 has pockets 22 in which the planets 4 are rotatably mounted so that the planets 4 can rotate about their respective longitudinal axes. The planet carrier 21 has flanges 23 located axially on both sides of the nut element 20, on the sides of which the pockets 22 are arranged. The planet carrier 21 engages around the nut element 20 with a sleeve section 24, which is connected with its axial ends to the flanges 23.

The nut element 20 is rotatably mounted on the planet carrier 21 by means of a first mounting 25. In this exemplary embodiment, both tensioning sleeves 12, 13 are each mounted axially and radially on the planet carrier 21 by means of a first bearing 26 of the first mounting 25.

The planet carrier 21 is rotatably mounted on a housing 28 by means of a second mounting 27 having a second bearing 29. The first and the second bearings 26, 29 are arranged on end faces of the two flanges 23 facing away from one another.

Each flange 23 is provided with a first bearing seat 30 for the first bearing 26 and with a second bearing seat 31 for the second bearing 29. The flanges 23 are non-rotatably connected to one another by means of the sleeve section 24 and are connected with play axially with backlash with actuating play. The housing 28 has second bearing seats 42 for receiving the second bearings 29. The planet carrier 21 has the first bearing seats 30 for receiving the first bearings 26.

Figure 2:
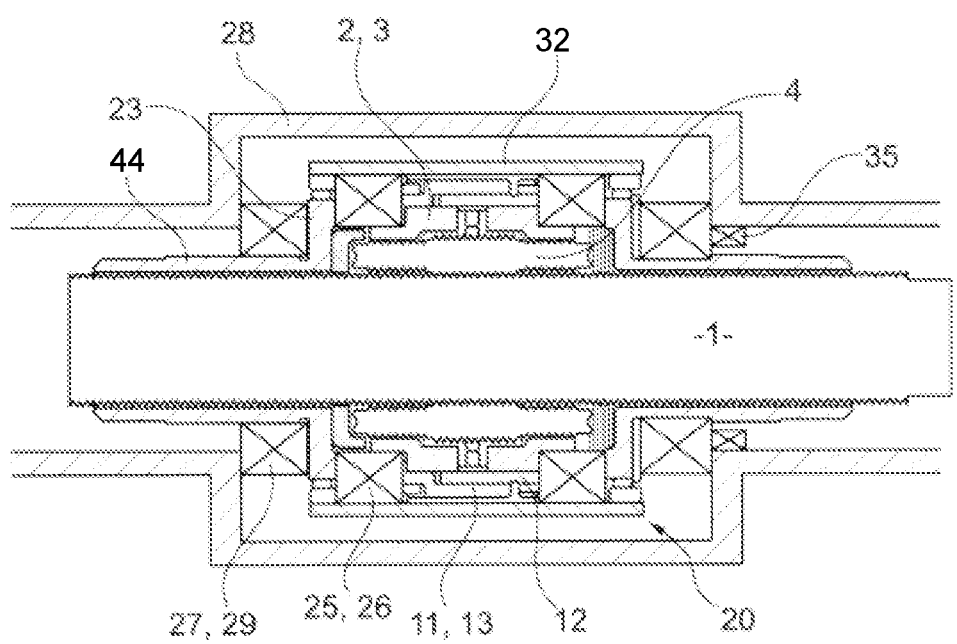
FIG. 2 shows another planetary roller screw in longitudinal section.
Figure 3:
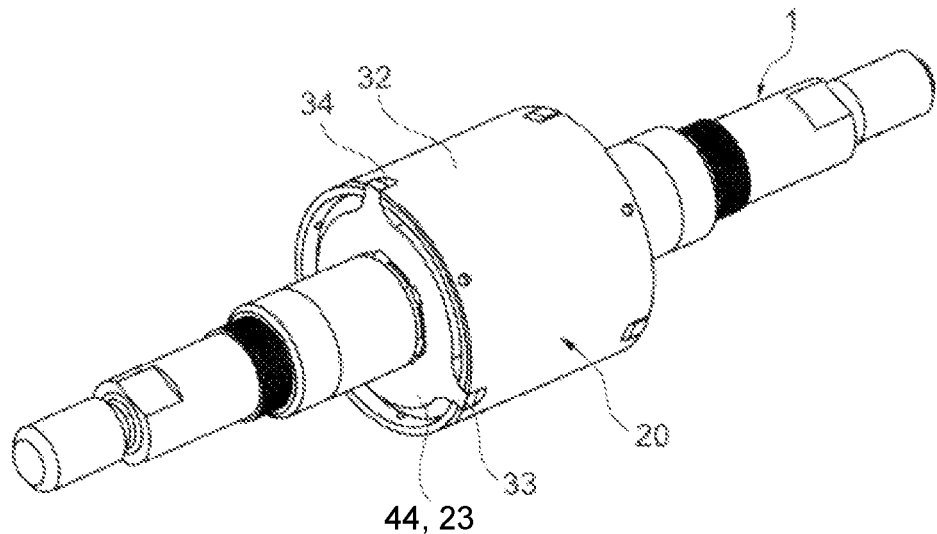
FIG. 3 shows the planetary roller screw according to FIG. 2 in a perspective view.

FIGS. 2 and 3 show another planetary roller screw in a constructive implementation. Corresponding components in FIGS. 1 and 2 have the same reference symbols. It can be clearly seen from FIG. 2 that a planet carrier 44 is made in several parts and has a sleeve 32 corresponding to the sleeve section 24 of FIG. 1, which is connected to the two flanges 23 in a rotationally fixed manner. The non-rotatable connection is made possible in this exemplary embodiment by lugs 33 of the flange 23 that are arranged distributed around the periphery and that engage in slots 34 of the sleeve 32 with axial play (FIG. 3). The axial play serves as actuating play for setting the mountings 25, 27 of the planetary roller screw in the housing 28.

To adjust the mountings 25, 27, the second bearings 29 are set axially towards one another. During this adjusting movement, the flanges 23 can be moved towards one another within the actuating play until the nut element 20 is properly supported on the planet carrier by means of the first bearings 26. This setting is made possible in this exemplary embodiment by an adjusting ring 35 that is axially supported on the one hand on the housing 28 and on the other hand is axially positioned against the second bearing 29. An undesirable axial play between the nut element 20 and the housing is eliminated after the adjustment to such an extent that the planetary roller screw can be operated with a high degree of accuracy.

Figure 4:
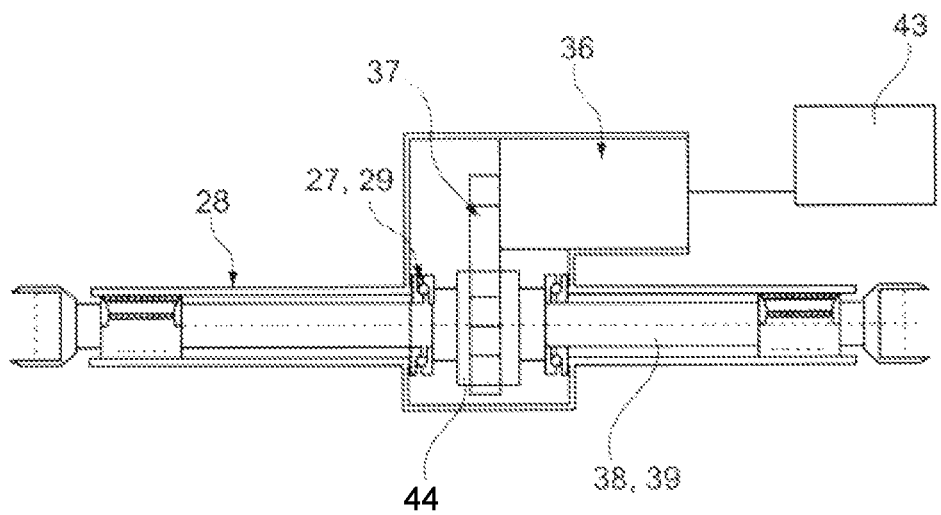
FIG. 4 shows an actuator of a rear axle steering of a motor vehicle having such a planetary roller screw.

FIG. 4 shows a schematic representation of an actuator for a steering device of a motor vehicle, specifically for rear axle steering or for a steer-by-wire steering system. An electric motor 36 drives the planet carrier 21 of the planetary roller screw by means of a belt drive 37. The housing 28 here includes the planetary roller screw and the belt drive 37 and protects these components from external influences. The electric motor 36 can be integrated into the housing 28 or flanged thereto. A steering rod 38 penetrates the housing 28 and is connected with its fork-shaped ends to wheel control arms (not shown). The threaded spindle 1 is part of the steering rod 38, which is formed from steering bars 39 at the end and the threaded spindle 1 arranged between the steering rods. Control signals are controlled by an ECU—control/regulating unit—43, which takes into account a large number of parameters on the input and output side, for example the ACTUAL and TARGET position of the steering rod 38, vehicle speed, steering angle, lateral acceleration.

This actuator is designed to be self-inhibiting or inhibiting. If the electric motor fails, the position of the steering rod 38 freezes. Under external forces acting on the steering rod 38, a rotary movement of the planetary roller screw, which is set with a sufficiently high preload, is avoided.

LIST OF REFERENCE SYMBOLS

1 Threaded spindle
2 Nut
3 Nut part
4 Planet
5 End section
6 Central section
7 Groove profile
8 Groove profile
9 Thread profile
10 Groove profile
11 Tensioning element
12 Tensioning sleeve
13 Tensioning sleeve
14 External thread
15 Internal thread
16 Radial rim
17 Radial rim
18 Nut seat
19 Nut seat
20 Nut element
21 Planet carrier
22 Pockets
23 Flange
24 Sleeve section
25 First mounting
26 First bearing
27 Second mounting
28 Housing
29 Second bearing
30 First bearing seat
31 Second bearing seat
32 Sleeve
33 Lug
34 Slot
35 Actuating ring
36 Electric motor
37 Belt drive
38 Steering rod
39 Steering bar
40 Spacer disk
42 Second bearing seat
43 ECU
44 Planet carrier

The invention claimed is:

1. A planetary roller screw having a threaded spindle, and having a nut element arranged on the threaded spindle, and having planets arranged distributed around a periphery of the threaded spindle, which mesh on one side with the threaded spindle and on the other side with the nut element, which is rotatably mounted via a first bearing pair on a rotationally driven planet carrier that receives the planets and is rotatably mounted on a housing via a second bearing pair, wherein the planet carrier has a sleeve radially surrounding the nut element and a pair of flanges on opposite ends of the sleeve, each flange having a first bearing seat of one of the first bearing pair and a second bearing seat of one of the second bearing pair, each one of the pair of flanges being connected with axial play to one another via a rotationally fixed connection between each one of the pair of flanges and the sleeve, and an adjustment ring configured for axially adjusting one of the bearings of the second bearing pair is supported on the housing.

2. The planetary roller screw according to claim 1, wherein the bearings of the first bearing pair are arranged axially between the bearings of the second bearing pair, the bearings of the first bearing pair being arranged on mutually facing flange sides of the flanges and the bearings of the second bearing pair being arranged on sides of the flanges facing away from one another.

3. The planetary roller screw according to claim 1, the nut element of which has a nut and a tensioning element which pretensions two nut parts of the nut arranged axially one behind the other in an axial direction.

4. The planetary roller screw according to claim 1, the planets of which are in rolling engagement with their planet-side groove profile with a nut-side groove profile of the nut and a thread profile of the threaded spindle.

5. An actuator for a steering device of a motor vehicle, having a housing in which the planetary roller screw according to claim 1 is arranged, and having a steering rod penetrating the housing, part of which is the threaded spindle, and having an electric motor driving the planet carrier.

6. A steering device of a motor vehicle comprising:
a housing;
a threaded spindle;
a plurality of planets distributed around a periphery of the threaded spindle and meshing with the threaded spindle and with a nut element;
a planet carrier sleeve;
two flanges arranged on opposite ends of the planet carrier sleeve and supporting the planets, the two flanges connected with axial play relative to one another via the planet carrier sleeve, such that the two flanges are rotationally fixed to the sleeve;
a first set of bearings supporting the nut element with respect to the flanges;
a second set of bearings supporting the flanges with respect to the housing; and
an adjusting ring supported on the housing and configured to adjust an axial position of one bearing of the second set of bearings.

7. The steering device according to claim 6, wherein the flanges each have a first bearing seat on an outer side for a bearing of the first set of bearings and a second bearing seat on an inner side for a bearing of the second set of bearings, the inner sides of the two flanges facing one another.

8. The steering device according to claim 6, wherein the nut element comprises
two nut parts arranged axially; and
a tensioning element which pretensions two nut parts in an axial direction.

9. The steering device according to claim 8, wherein the planets have a first groove profile meshing with the threaded spindle and second groove profiles meshing with the two nut parts.

10. The steering device according to claim 6, further comprising:
a steering rod penetrating the housing and including the threaded spindle; and
an electric motor driving the planet carrier sleeve.

11. A steering device of a motor vehicle comprising:
a housing;
a threaded spindle;
a plurality of planets distributed around a periphery of the threaded spindle and meshing with the threaded spindle and with a nut element;
a planet carrier having:
a sleeve radially surrounding the nut element; and
two flanges arranged on opposite ends of the sleeve and supporting the planets, the two flanges connected with axial play relative to one another via a rotationally fixed connection between each one of the two flanges and the sleeve; and
a first set of bearings supporting a first inner side of each of the two flanges; and
a second set of bearings supporting a second outer side of each of the two flanges.

12. The steering device of claim 11, further comprising an adjusting ring configured to adjust an axial position of one of the bearings of the second set of bearings.

\* \* \* \* \*